United States Patent [19]

Soteropulos et al.

[11] 4,008,905
[45] Feb. 22, 1977

[54] HITCH ADAPTER

[75] Inventors: Gust Soteropulos; James Lee Vogt, both of Ottumwa, Iowa

[73] Assignee: Deere & Company, Moline, Ill.

[22] Filed: Oct. 24, 1975

[21] Appl. No.: 625,545

[52] U.S. Cl. .......................... 280/506; 180/14 R; 280/515; 403/3; 403/149
[51] Int. Cl.² .......................................... B60D 1/00
[58] Field of Search ......... 180/14 R; 280/515, 506, 280/504, 514, 507; 403/288, 345, 149, 3; 248/274, 354 C

[56] References Cited

UNITED STATES PATENTS

| | | | |
|---|---|---|---|
| 2,556,748 | 6/1951 | Buckley | 280/515 X |
| 2,668,744 | 2/1954 | Cockrell | 248/274 X |
| 2,772,596 | 12/1956 | Trussell | 280/661 X |
| 2,998,268 | 8/1961 | Witter | 280/506 |
| 3,557,892 | 1/1971 | Burrough | 180/14 R |
| 3,794,357 | 2/1974 | Frye | 280/515 |

FOREIGN PATENTS OR APPLICATIONS

| | | | |
|---|---|---|---|
| 500,320 | 3/1954 | Canada | 280/515 |
| 1,157,932 | 11/1963 | Germany | 280/506 |
| 580,624 | 9/1946 | United Kingdom | 280/504 |

*Primary Examiner*—Robert R. Song
*Assistant Examiner*—John P. Silverstrim

[57] ABSTRACT

An agricultural tractor as a rearwardly extending drawbar and a rearward PTO output shaft connectible to an input drive shaft on a trailing PTO driven implement through a telescoping drive assembly, which includes front and rear universal joints. The drawbar is connected to the implement tongue through a hitch adapter which provides articulation between the tractor and the implement about a vertical axis that is equidistant from the two universal joints, so that the universal joints articulate at equal angles when the tractor is turned relative to the implement. The hitch adapter includes a housing having top and bottom walls, a vertical pin being insertable into vertically aligned bores in the top and bottom walls and into a vertical bore in the drawbar to connect the hitch adapter to the drawbar, the adapter having a vertical pivot element rearwardly of the pin for pivotal connection to the forward end of the implement tongue. A locking device is provided on the housing to releasably lock the pin in said bores to prevent inadvertent separation of the hitch adapter from the drawbar, and shim means are provided between a horizontal plate and the top wall of the housing to vary the clearance between the plate and a bottom wall of the housing to accommodate different vertical thicknesses of a tractor drawbar, the drawbar being disposed between and abutting the plate and the housing bottom wall.

6 Claims, 3 Drawing Figures

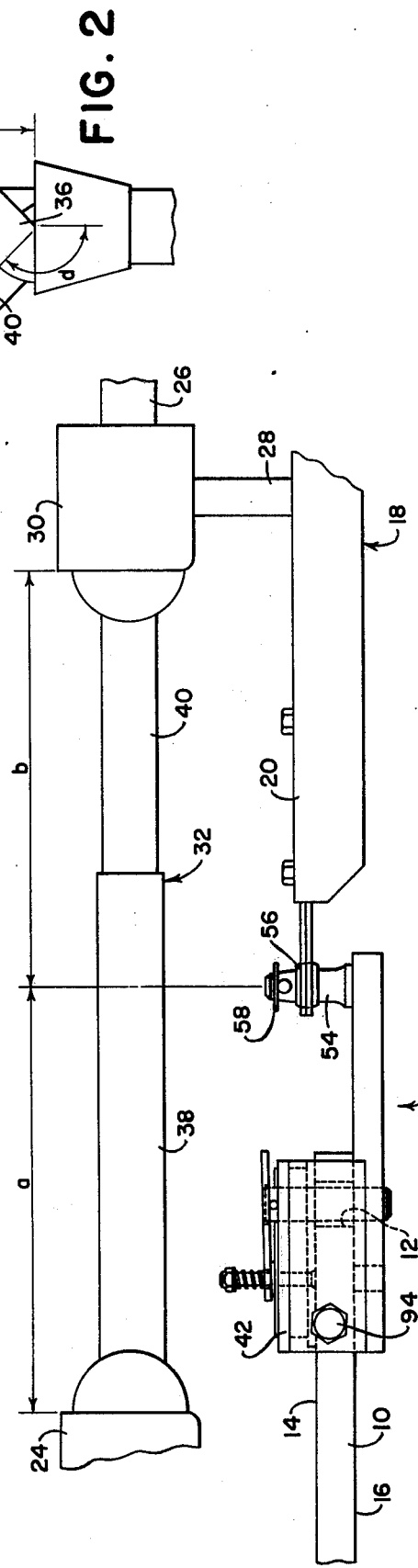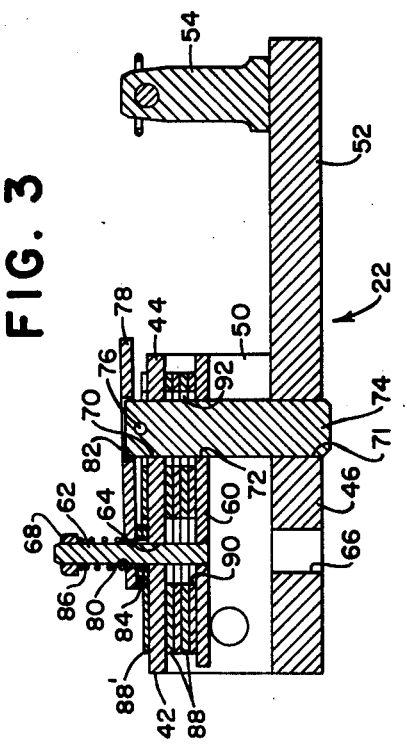

HITCH ADAPTER

BACKGROUND OF THE INVENTION

This invention relates to a hitch adapter for a tractor drawbar that provides equal angle articulation of universal joints in the drive assembly that connects the tractor PTO to a driveshaft on a towed implement. An adapter of this general nature is shown in U.S. Pat. No. 3,557,892, which is also assigned to the assignee herein.

In the adapter shown in said patent, equal angle articulation of the front and rear universal joints in the drive assembly are provided by shifting the vertical articulation point between the implement and the tractor drawbar rearwardly, although the vertical load on the tractor drawbar is not affected. This feature is highly desirable when heavier drawbar loads are involved so as not to overload the drawbar. However, in some instances the nature of the towed implement is such that rearward extension of the vertical load on the drawbar does not overload the drawbar, and accordingly, a hitch adapter has been provided whereby both the vertical load and the articulation point between the tractor and the implement are shifted rearwardly. Such an adapter has been offered by the assignee herein for several years, although said adapter is not shown in a patent or patent application. Generally, said adapter included a housing having horizontal top and bottom walls and vertical side walls, the tractor drawbar extending into the housing and being pinned therein by a vertical pin extending through the top and bottom walls and a vertical bore on the end of the drawbar. Adjustment for different drawbar widths was accomplished by a pair of transverse bolts extending through the opposite side walls and engaging the opposite sides of the drawbar, while adjustment for different vertical drawbar thicknesses was accomplished by a similar adjusting bolt extending through the top wall and engageable with the top of the drawbar. A vertical post was provided at the rearward end of the adapter for pivotal connection to the forward end of the implement tongue, the axis of the post being centered between the two universal joints to provide said equal angle articulation.

SUMMARY OF THE INVENTION

According to the present invention, there is provided an improved hitch adapter of the above general type, wherein the axis of articulation between the implement and the tractor is shifted rearwardly to provide for equal angle articulation of the universal joints in the drive line to the implement.

An important feature of the invention resides in improved means for adjusting the adapter to accommodate drawbars having different vertical thicknesses. More specifically, a horizontal plate is provided that engages the top of the drawbar, while the bottom of the drawbar is engaged by the bottom of the adapter housing, shim means being provided between the plate and the top of the housing to vary the clearance between the bottom of the housing and the plate to accommodate different drawbar thicknesses. Also according to the invention, means are provided for storing shims on top of the adapter, so that they are readily available when the adapter is moved from one tractor to another.

Another important feature of the invention resides in the provision of a locking device that engages the top of the pin connecting the adapter to the drawbar to prevent the inadvertent bouncing out or removal of the pin that could cause separation of the adapter from the drawbar and consequently permits separation of the implement from the tractor.

A further feature of the invention resides in the simple, durable, and economical construction of the adapter, which makes it easy to install or adjust.

BRIEF DESCRIPTION OF THE DRAWINGS

FIG. 1 is a somewhat schematic side elevation view of the improved adapter connecting a tractor drawbar to an implement tongue;

FIG. 2 is a plan view of the adapter connecting the drawbar to the tongue, showing the drive line and components during 90° articulation of the tractor relative to the implement;

FIG. 3 is an enlarged, fore and aft, vertical section along the center line adapter.

DESCRIPTION OF THE PREFERRED EMBODIMENT

The invention is embodied in a tractor having a rearwardly extending drawbar, indicated by the numeral 10, only the drawbar portion of the tractor being shown in the drawings. The drawbar has a vertical bore 12 adjacent its rearward end and has a generally rectangular vertical cross-section, with horizontal top and bottom sides 14 and 16, respectively.

An implement, only the forward portion of which is shown in the drawings, is indicated by the numeral 18 and includes a fore and aft implement tongue 20 that is connectible to the drawbar 10 by means of a hitch adapter, indicated in its entirety by the numeral 22.

The tractor has a conventional rearward PTO output shaft, which is not shown in detail and is covered by a schematically illustrated shield 24. The implement includes a fore and aft drive shaft 26 supported above the tongue 20 by a vertical mast 28, the forward end of the drive shaft being covered by a shield 30. A drive assembly or tractor hookup assembly, indicated generally by the numeral 32, is connectible to the forward end of the implement drive shaft 26 and to the tractor PTO output shaft to drivingly connect the implement driveshaft to the tractor PTO, in a well known manner. The drive assembly includes a forward universal joint, schematically illustrated at 34, and a rear universal joint, schematically illustrated at 36, which accommodates articulation of the drive line as the implement articulates relative to the tractor. The drive assembly articulates at both the front and rear universal joints as shown in FIG. 2 and includes telescoping front and rear portions 38 and 40, which accommodate the increase or decrease in the effective length of the assembly necessary during articulation of the implement relative to the tractor about either a vertical axis or a transverse axis.

The hitch adapter 22 includes a generally tubular housing 42 open at its forward and rearward ends. The housing has a generally square cross-section with horizontal top and bottom walls 44 and 46 and upright fore and aft right and left side walls 48 and 50 respectively. The bottom wall is substantially thicker than the other walls and includes a rear extension 52 that carries a vertical post or pivot element 54 at its rearward end. The implement tongue 20 has a socket 56 on its forward end that is adapted to receive the pivot element 54 to permit articulation of the tongue relative to the hitch adapter 22 in any direction. A conventional lock pin 58 extends through the post or pivot element 54 to lock the socket on the pivot element and thereby lock the implement to the adapter.

The adapter also includes a horizontal plate 60 mounted in the housing 42 below the top wall, the plate being parallel to and substantially coextensive with the top wall. A vertical post 62 in the form of a bolt is mounted in and extends upwardly from the plate 60 through a bore 64 in the top wall 44, the threaded upper end of the bolt-like post 62 being disposed above the housing. The bottom wall 46 of the housing is provided with a bore 66 in alignment with the bore 64 to permit the post 62 to be removed through the bottom of the housing. A nut 68 is threaded on the upper end of the post to removably retain the post in the bore 64.

The top and bottom walls 44 and 46 are respectively provided with vertically aligned bores 70 and 71, and the plate 60 is provided with a similar vertically aligned bore 72. The tractor drawbar 10 is insertable into the housing between the plate 60 and the bottom wall 46 with the drawbar bore 12 in alignment with the bores 70, 71, and 72, and a hitch pin 74 is insertable through the three bores in the adapter and the bore 12 in the drawbar to lock the adapter on the drawbar. The hitch pin 74 is provided with a conventional lock pin 76 at its upper end to prevent the downward movement of the hitch pin 74 through the adapter.

A generally fore and aft, flat, horizontal lock member 78 is mounted on top of the housing and includes a front vertical bore 80 through which the post 62 extends. The lock member 70 also includes a rear vertical bore 82 in alignment with the bores 70, 71 and 72, the bore 82 receiving the upper end of the hitch pin 74, although the lock pin 76 prevents downward movement of the lock member relative to the hitch pin. As is apparent, the lock member, when in the position shown in the drawing with the upper end of the hitch pin disposed in the bore 82, overlies the hitch pin and prevents vertical removal thereof. A pair of washers 84 are mounted on the post 62 between the top wall 44 and the lock member 78, and a helical compression spring 86 is mounted around the post between the lock member 78 and the nut 68 on the upper end of the post. Thus, the spring 86 exerts a downward force of the forward end of the lock member and simultaneously exerts an upward force on the post to bias the plate 60 toward the top wall 44.

It is desirable that the space between the plate 60 and the bottom wall 86 be spaced substantially the same as the vertical dimension of the drawbar, so that the hitch adapter is relatively rigid with the drawbar, and for that purpose a plurality of shims 88 are mounted in the housing between the housing top wall 44 and the plate 60, the shims being added or subtracted to adjust the spacing between the plate and the housing bottom wall to accommodate different size drawbars. The shims 88 are substantially identical, although they may vary in vertical dimension, each shim having a front vertical bore 90, through which the post 62 extends, and a rear vertical bore 92, through which the hitch pin 74 extends. Spare shims, indicated by the numeral 88', can be mounted on the top of the housing top wall 44 the front and rear bores again accommodating the post and its washers and the hitch pin, as shown in FIG. 3.

To provide for lateral rigidity of the adapter 22 relative to the drawbar, a pair of adjusting bolts 94 are threadable in threaded bores in the opposite housing side walls 48 and 50, the inner ends of the adjusting bolts engaging the opposite sides of the drawbar 10 as shown in FIG. 2. As is apparent, the adjusting bolts are threadable in and out to accommodate different width drawbars, and lock nuts 96 are provided on the bolts 94 adjacent the side walls to lock the bolts in their selected position.

In operation, when the hitch adapter 22 is mounted on the drawbar 10 and the implement tongue 20 is connected to the hitch adapter, as shown in FIG. 1, the axis of the hitch adapter pivot element 54 is equally equidistant from the axis of the front and rear universal joints 34 and 36, the two equal distances being indicated by the letters $a$ and $b$ in FIG. 1. When the tractor articulates relative to the implement, the distances $a$ and $b$ remain equal, as shown in FIG. 2, the drive assembly 32 cutting the corner across the articulating drawbar and implement tongue to form a triangle therewith as shown in FIG. 2. Since the two sides of the triangle, indicated by $a$ and $b$, are equal, an isosceles triangle is formed, whereby the angles $c$ and $d$ at the opposite ends of the base of the triangle are equal, said angles representing the equal angles of articulation of the drive line at the two universal joints. As described in said U.S. Pat. No. 3,557,892 the equal angle of articulation provides a constant speed in the implement drive line regardless of the angle of articulation. The hitch adapter can be left with the tractor, the implement 18 being separated from the tractor by simply removing the lock pin 58 and lifting the implement tongue off the pivot element 54. The adapter can also be left with the implement by separating the adapter from the tractor drawbar 10 by simply raising the lock member 78 against the bias of the spring 86, so that it clears the hitch pin 74, after which the lock member is swingable to one side to permit upward withdrawal of the hitch pin 74, after which the adapter can be separated from the drawbar.

If the implement is to be used with a different tractor having a drawbar of different vertical thickness, the adapter can be easily adjusted to accommodate the different tractor drawbar by simply adding or removing shims 88. This is accomplished by removing the nut 68, permitting the post 62 to drop through the bore 46, after which shims can be shifted to or from the supply of shims on top of the housing to or from the pack of shims between the plate 60 and the housing top wall. After the desired spacing between the plate and the housing bottom wall is achieved to accommodate the tractor drawbar, the nut is simply replaced on the top of the post. As is apparent, the spring 86 biases the post and consequently the plate 60 upwardly to clamp the shims against the top wall and maintain the opening between the plate and the bottom wall for the insertion of the drawbar.

We claim:

1. In a hitch adapter for connecting a tractor drawbar having flat, generally horizontal top and bottom sides and a vertical bore, to an implement tongue having a forward hitch element, the adapter including a forwardly open housing adapted to receive the rearward end of the drawbar and including top, bottom and opposite side walls, a vertical pin mounted in the housing and extendable through the drawbar bore, and a pivot member rearwardly of the pin and pivotally connectible to the hitch element on the implement tongue, the improvement comprising: a vertically adjustable, generally horizontal plate member mounted in the housing between the top and bottom walls; shim means insertable between the top of the plate member and the housing top wall to selectively vary the clearance between the plate and the bottom wall, so that the plate member and the bottom of the housing respectively engage the top and bottom sides of the drawbar when the adapter is connected to the drawbar, the selectively variable clearance accommodating drawbars having different vertical thicknesses; and connecting means between the plate member and the housing operative to accommodate vertical adjustment only of the plate member relative to the housing and including spring means operative to bias the plate member upwardly toward the housing top wall to clamp the shim means to the housing.

2. The invention defined in claim 1 wherein the housing top wall has a vertical bore and the connecting means includes a vertical post connected to the plate member and extending upwardly through the bore in the top wall, the spring means being operative between the upper end of the post and the top of the housing.

3. The invention defined in claim 2 wherein the shim means includes a plurality of horizontal shim elements having vertical bores, the post extending through the vertical bores in the shim elements when the shim elements are disposed between the top wall of the housing and the plate member.

4. The invention defined in claim 3 wherein the top wall of the housing includes a flat area on its top side adjacent the post, at least one of the shim elements being mountable on the flat area on the top side of the top wall with the post extending through its bore to store said shim element in a non-operative position.

5. The invention defined in claim 2 wherein the housing includes vertically aligned bores in the top and bottom walls respectively for receiving the upper and lower ends of the pin, the pin being upwardly extractable from the housing bore and the drawbar bore to permit separation of the adapter from the drawbar, and the adapter includes a horizontal locking element mounted on the top side of the housing top wall on said post and overlying the pin, the spring means enagaging the top of the locking element to bias it downwardly so that the locking element exerts a downward force on the top of the pin to releasably retain the pin in said bores.

6. In a hitch adapter for connecting a tractor drawbar, having flat, generally horizontal top and bottom sides and a vertical bore, to an implement tongue, having a forward hitch element, the adapter including a forwardly open housing adapted to receive the rearward end of the drawbar and including top, bottom and opposite side walls, a vertical pin downwardly insertable into vertically aligned bores in the top and bottom walls and into the drawbar bore to lock the adapter to the drawbar and including stop means limiting the downward movement of the pin through said bores and a pivot member rearwardly of the pin and pivotally connectible to the hitch element on the tongue, the improvement comprising: a horizontal plate member mounted in the housing between the top and bottom walls, the top wall including a second bore forwardly of the bore for said pin; a generally vertical post connected to the plate member and extending upwardly through said second bore; a generally horizontal locking element mounted on top of the housing and shiftable between a locking position wherein it overlies the pin to prevent upward withdrawal of the pin from said bores and an unlocking position wherein it allows said withdrawal; spring means operative between the post and the locking member to bias the locking member downwardly; and shim means mountable in the housing between the plate member and the top wall to selectively vary the spacing between the plate member and the bottom wall, the spring means biasing the plate member upwardly to clamp the shim means between the plate member and the top wall.

* * * * *